United States Patent [19]
Grigorian et al.

[11] Patent Number: 5,813,382
[45] Date of Patent: Sep. 29, 1998

[54] OIL PAN DRAIN PORT ADAPTER SYSTEM FOR ENGINE FLUSHING APPARATUS

[75] Inventors: Victor A. Grigorian, Glendale; Martin Renwick, Sherman Oaks; Seymour Seplow, Studio City, all of Calif.

[73] Assignee: EnviroLution, Inc., Glendale, Calif.

[21] Appl. No.: 854,993

[22] Filed: May 13, 1997

[51] Int. Cl.$^6$ .................................................. F01M 1/00
[52] U.S. Cl. .......................... 123/196 R; 134/169 A; 184/1.5
[58] Field of Search ................ 123/196 R, 196 A; 184/1.5, 6.24; 134/169 A

[56] References Cited

U.S. PATENT DOCUMENTS

| | | | |
|---|---|---|---|
| 3,431,145 | 3/1969 | Riley | 134/22 |
| 3,489,245 | 1/1970 | Broadwell | 184/1.5 |
| 3,797,507 | 3/1974 | Jackson | 134/102 |
| 4,951,784 | 8/1990 | Bedi | 123/196 A |
| 5,048,578 | 9/1991 | Dorf et al. | 141/346 |
| 5,063,896 | 11/1991 | Hyatt et al. | 123/198 A |
| 5,094,201 | 3/1992 | Bedi | 123/196 A |
| 5,131,421 | 7/1992 | Hofbauer | 134/166 R |
| 5,168,844 | 12/1992 | Waelput | 123/196 A |
| 5,232,513 | 8/1993 | Suratt et al. | 134/21 |
| 5,291,863 | 3/1994 | Jones | 123/196 A |
| 5,452,695 | 9/1995 | Bdi | 123/196 A |
| 5,467,746 | 11/1995 | Waelput et al. | 123/196 A |
| 5,474,098 | 12/1995 | Grigorian et al. | 134/169 A |
| 5,526,782 | 6/1996 | Bedi et al. | 123/196 A |
| 5,566,781 | 10/1996 | Robert et al. | 123/196 A |
| 5,711,822 | 1/1998 | Burgett | 134/169 A |

*Primary Examiner*—John T. Kwon
*Attorney, Agent, or Firm*—Fulwider Patton Lee & Utecht, LLP

[57] ABSTRACT

The oil pan drain port adapter assembly for an engine flushing system includes a main adapter member and a plurality of interchangeable adapter members. Each of the interchangeable adapter members includes a first threaded cylindrical end portion for engaging and mating with a corresponding threaded portion in the oil pan drain port, an opposing end portion forming an annulus, and an interior lumen connecting the first threaded cylindrical end portion and the opposing end portion in fluid communication. The opposing end portion of each interchangeable adapter member is received in the inlet end of the main adapter member at a fixed angle of orientation. The annulus has a plurality of apertures extending through the annulus to permit fluid flow from the interchangeable adapter member to the inlet of the main adapter member. A set screw extends within and rides in the annulus of the interchangeable adapter member, preventing the interchangeable adapter member from being dislodged from the main adapter member.

22 Claims, 4 Drawing Sheets

OIL PAN DRAIN PORT ADAPTER SYSTEM FOR ENGINE FLUSHING APPARATUS

BACKGROUND OF THE INVENTION

1. Field of the Invention

This invention relates generally to a flushing apparatus for internal combustion engines, and more particularly concerns an improved configuration for an oil pan drain port adapter assembly to be connected to the oil pan drain of an internal combustion engine.

2. Description of Related Art

During operation of the internal combustion engine, oil is taken from the oil pan, where it is typically stored, and circulated throughout the engine to lubricate the internal moving parts. For optimal engine operation and life, and for effective lubrication, the oil must be clean and maintain its lubricating qualities. To keep the oil free of the larger metal particles and dirt that inevitably are created and accumulate in the oil with continued engine use, a replaceable oil filter is typically carried on the engine. Additionally, to eliminate the more minute particles and acid that builds up in the oil, which the filter cannot remove, the engine oil pan is periodically drained and replenished with new oil, and a new oil filter may be installed.

Even with such periodic maintenance not all the foreign particles are removed. Over time an oily "sludge" is formed within parts of the engine from such foreign particles, particularly in the oil pan. That sludge degrades engine performance, and can release particles after the oil has been replaced. The presence of those particles in the oil leads to premature engine wear.

To reach and remove that sludge without disassembling the engine, an engine flushing apparatus is known which treats the engine with a cleaning solution, circulating the cleaning fluid through the engine and oil drain pan from which the engine oil has been drained. In such an flushing apparatus a conduit, typically a hose, capable of withstanding fluid under pressure, is connected to the oil filter port leading to the engine's lubrication system. Another conduit is connected to the drain plug port at the engine's oil pan. The flushing fluid is circulated from the apparatus through one conduit, into the engine, whereby the fluid ideally dissolves the sludge and collects any foreign particles in suspension. The flushing fluid exits the engine with the dissolved and suspended waste via the oil pan drain port and the second conduit, through which the now "dirty" flushing fluid is returned to the flushing apparatus for further processing or disposal.

Such conventional flushing apparatus continues circulating the cleaning fluid for a prescribed treatment period. Since the size and type of oil filter port and oil pan drain port differs from automobile manufacturer to manufacturer and even among different models or model year of a single auto manufacturer, the flushing apparatus includes a necessary set of associated adapters to permit connection of the conduits to the respective oil filter and oil pan drain ports of the vast majority of automobile engines.

In fitting adapters to oil pan drain port of the engine, many components and accessories packed in the engine compartment of modern automobiles provide formidable obstructions to connection of the flushing apparatus to the oil pan drain port. Accordingly, it would be desirable to provide a configuration for adapter assemblies for the oil pan drain port that can more easily fit in restricted spaces of an engine compartment during the flushing operation. The present invention meets these needs.

SUMMARY OF THE INVENTION

Briefly, and in general terms, the present invention provides for an improved flushing system for cleaning internal combustion engines of a wide variety of makes and models that employs the engine's oil filter port and oil pan drain port to circulate the flushing fluid to the engine components, such as the crankshaft, and to other components, such as the oil pump and oil pan.

The present invention accordingly provides for an oil pan drain port assembly for a flushing apparatus for internally cleaning internal combustion engines. In one presently preferred embodiment, the invention provides for an oil pan drain port assembly for an engine flushing system for circulating flushing fluid through an internal combustion engine to clean the internal combustion engine, the engine being of the type containing an engine block, an oil filter port on the engine block and an oil drain pan having an oil drain plug port. The engine flushing system typically includes a flushing apparatus for delivering a volume of flushing fluid and receiving used flushing fluid, a first conduit for conducting flushing fluid from the flushing apparatus to the oil filter port, and second conduit for conducting flushing fluid from the oil pan drain port via the improved oil pan drain port adapter system to the flushing apparatus.

An improved configuration for an assembly of oil pan drain port adapters for the flushing apparatus allows the oil drain plug port adapters to be utilized in restricted spaces. In a presently preferred embodiment, the oil pan drain port adapter system of the invention includes a main adapter member and assorted interchangeable adapter members that contain an annulus that mates with a corresponding portion of the main adapter member, forming a fixed angle so that the combination can fit in restricted spaces between the oil pan drain port of various automobiles and adjacent parts of the automobile.

An interchangeable adapter member is fitted into the main adapter member through an O-ring that prevents fluid leakage from the connection between the main adapter member and the connected interchangeable adapter member. The interchangeable adapter members have a threaded end for mating with a correspondingly threaded oil pan drain port, with dimensions of the interchangeable adapter member selected depending on the thread and oil pan drain port size of the different engines. In a currently preferred embodiment, the interchangeable adapter member can also be prevented from separating from the main adapter member by a set screw that is disposed in the main adapter member and seats in the annulus of each interchangeable adapter member. An O-ring is also preferably installed on the interchangeable adapter member where it mates with the engine oil pan drain port to prevent fluid leakage at the connection between the interchangeable adapter member and the oil pan drain port.

These and other aspects and advantages of the invention will become apparent from the following detailed description, and the accompanying drawing, which illustrates by way of example the features of the invention.

DETAILED DESCRIPTION OF THE PREFERRED EMBODIMENTS

In order to remove sludge from an internal combustion engine, an engine flushing apparatus can be used to circulate a flushing fluid through the engine and oil pan from which the engine oil has been drained. The area of an engine compartment can impose strict space limitations on an adapter assembly connected between the flushing apparatus and the drain port at the engine's oil pan.

Figures 1, 2:
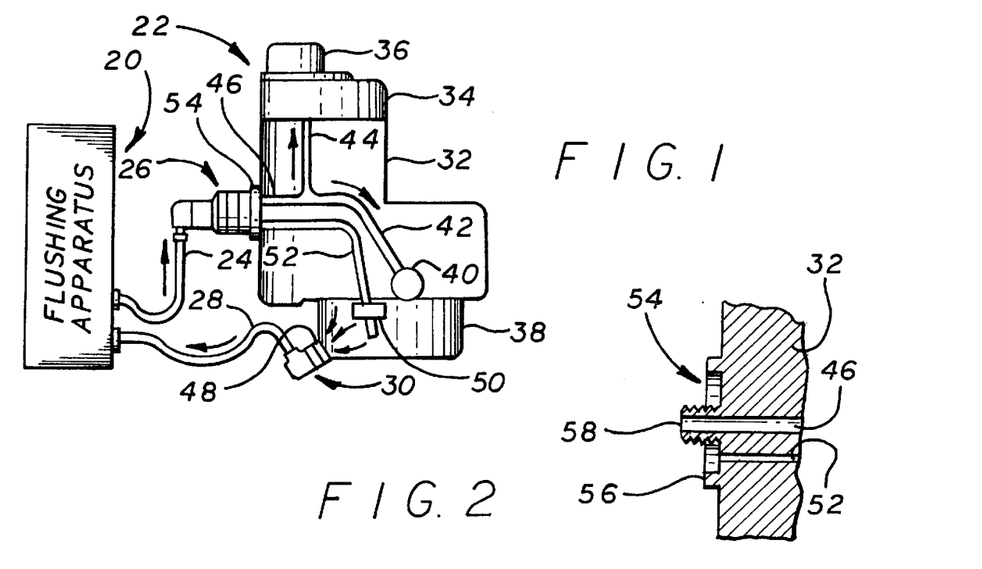
FIG. 1 schematically illustrates the engine flushing system in operation, including the flushing apparatus, an engine, and the adapters.
FIG. 2 is a partial sectional view of the oil filter port of the engine.

As is illustrated in the drawings, the invention is accordingly embodied in an improved oil pan drain port adapter system for an engine flushing system for circulating flushing fluid through an internal combustion engine to clean the internal combustion engine. Referring to FIG. 1, an engine flushing apparatus 20 for flushing the lubrication system of an internal combustion engine 22 includes a conduit or hose 24 connecting the fluid output from the flushing apparatus to engine 22 by an oil filter port adapter assembly 26, and a second conduit or hose 28 returning flushing fluid to the flushing apparatus by means of oil pan drain port adapter assembly 30 that is connected to the oil pan drain port of the engine.

The operating components of the flushing equipment and of the engine are neither illustrated nor described in detail since they are well known, are of a conventional structure and do not form a part of the present invention. However, a conventional flushing apparatus 20 typically contains the flushing fluid, typically a known cleaning solution, which is pumped from the flushing apparatus and is outputted through hose 24 to the engine. The returned "dirty" flushing fluid is piped back to the flushing apparatus through hose 28. The flushing apparatus includes appropriate electrical controls, not illustrated, to initiate operation, and an electronic digital computer for controlling the operation of the various controls and the duration of the flushing treatment.

The oil filter port typically includes a first oil passage into the engine block for routing oil from the oil filter port to the crankshaft and other internal engine components and a second oil passage for routing fluid from the oil pan and oil pump to the oil filter port. The flushing apparatus typically delivers a volume of flushing fluid through a first conduit to the oil filter port, and receives used flushing fluid through a second conduit from the oil pan drain port.

Engine 22 includes an engine block 32 which contains a cylinder head 34 and valve cover 36. An oil pan 38 is secured to the lower end of the engine. A crankshaft 40 within the engine block receives oil from passage 42. In like manner, the valves and other components within the engine block including the piston cylinder arrangement receive lubricating oil through a second oil passage 44. Oil is supplied to passages 42 and 44 by passage 46, from which the former passages branch out.

The oil pan is provided with an oil pan drain port 48, which has a threaded opening. In normal engine operation, a threaded drain plug, not illustrated, is screwed into place sealing the drain pan and is removed only when it is desired to drain used oil from the engine.

An oil pump 50 located within oil pan 38 is connected by a fluid passage 52 to an oil filter port 54. In normal engine operation a conventional oil filter, not illustrated, is connected at this port. Engine oil is pumped by pump 50 from oil pan 38 via conduit 52 through the filter, exits the filter and flows via conduits 46, 42 and 44 into the engine, allowing the filter to remove particulate material and other impurities that may be contained in the oil before reaching crankshaft 40 and other engine components.

The oil filter port of most modern American automobiles is intended for self-contained spin-on type filters, such as the type FL-1A sold under the Motorcraft brand. As represented in the partial section view of FIG. 2, such a design of an oil filter port 54 contains an annular border seal surface 56 encircling a projecting central hollow post 58, the latter defining a portion of a passage 46 into the engine block. Passage 46 typically branches into passages 42 and 44, as shown in FIG. 1. Another passage 52 into the engine block is located between post 58 and the bordering seal surface 56. The hollow post provides an oil passage into the engine block and serves as a mounting post for the spin-on oil filter. The conventional oil filter comprises a sealed cartridge, containing a threaded central passage, adapted to be screwed onto the oil filter port mounting post, and contains other passages peripheral of the central passage, intended for fluid communication with a passage in the oil filter port.

The engine flushing system comprises an adapter system including an oil filter adapter assembly and an oil pan drain pan port adapter assembly, which are illustrated in FIGS. 3 through 14 of the drawings. The oil filter port adapter assembly associated with the flushing apparatus preferably includes a universal coupling member or base, as variously termed, a set of principal adapters, and a set of secondary adapters. In forming an oil filter port adapter assembly for a particular engine application, a principal adapter of the correct size to fit the particular engine oil port mounting post is selected from the set and is mounted to the universal coupling member. The principal adapters are sized to couple to the oil filter's threaded mounting posts of various makes and models of automobiles and to divide the flushing fluid flow from the inlet side into different branches on the outlet side of the adapter element as hereinafter described in greater detail. The secondary adapters are used to compensate for different size annular oil port seal surfaces in instances where the principal adapter does not fit the annulus. Each secondary adapter mounts to any of the principal adapters.

Figure 3:
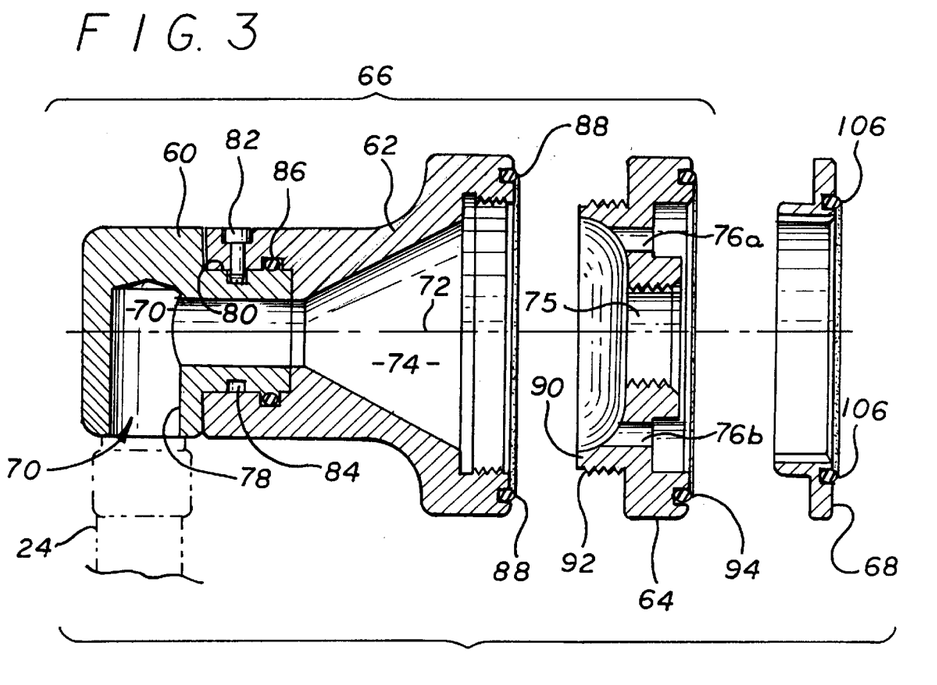
FIG. 3 is an exploded cross sectional view of one embodiment of an oil filter port adapter assembly of the invention.

With reference to FIG. 3, the oil filter adapter assembly includes a base or universal adapter coupling, as variously termed, formed in two parts, base members 60 and 62, a principal adapter 64, sometimes referred to as an oil filter port post adapter, and a secondary adapter 68, sometimes referred to as an oil filter port outer diameter adapter. The combination of the base members 60 and 62, and principal adapter 64 comprise the primary oil filter adapter assembly 66. Each of the foregoing are formed of metal, suitably aluminum. In general, the adapter coupling, as well as the attached adapters, have a generally cylindrical shape to the outer surface. These elements are assembled together in serial order in a nesting relationship, as will be described further below. The individual portions of the oil filter port adapter assembly define an internal fluid passage from the input tube 70 and through the assembly, that extends laterally, for the most part, along axis 72, and branches at adapter 64 into essentially two passages the first of which is the large central passage 74 along axis 72, which ultimately is coupled through to the passage in the hollow mounting post of the oil filter port, and the second of which extends through the smaller sized openings, only two of which 76a and 76b, are illustrated in the figure, that couple to the secondary passage in the oil filter port.

Base portion 60 contains an input pipe fitting 78 that is connected to the first conduit 24 from the flushing equipment. The pipe fitting leads into internally formed pipe threads in a passage oriented orthogonal to the axis of the base portion, which intersects the axially extending passage 74. A protruding axially extending hollow circular male coupling member 80 extends into mating engagement within a corresponding cylindrical walled portion of the complementary base member 62, the female portion of the coupling between the two portions to provide a secure fluid passage. Except for passage 70 and set screw 82 and the latter's screw passage, discussed hereafter, the coupler geometry is generally symmetrical about center line or axis 72.

An annular slot 84 in the outer wall of cylindrical portion 80 circumscribes the outer peripheral surface, that is, the slot extends about the passage axis. Complementary member 62 contains a threaded passage that extends through the outer wall orthogonal to the passage axis in an axial position that overlies slot 84. With the two members assembled together, a set screw 82 is threaded into the threaded passage and is screwed down until it extends into slot 84. This serves to prevent the two coupling parts from separating by being pulled apart. It also allows the two members to rotate in position relative to one another, since the end of the set screw rides along the peripheral slot. With the rotatable mounting between the coupling elements one may grip hose 24 and rotate base member 60 as may assist in installing the oil filter port adapter assembly in situations where there is limited clearance and/or obstructions in the automobile's engine compartment.

Because the universal coupling is formed in two parts as described, a potential fluid leakage path exists at the juncture between those two elements. As an additional feature of the invention, the base member incorporates a rotary gland, a conventional sealing device for rotary members. Forming the gland, the inside cylindrical wall of member 62 contains an annular slot axially positioned within the female coupling portion thereof that circumscribes portion 80 of the complementary base member. An O-ring seal 86 is seated within that slot and frictionally engages the outer surface of the male member 80 as well as the walls of the slot. The seal serves to prevent fluid in the internal passage from escaping the coupling parts. It also allows one of the base members 60 and 62 to rotate relative to the other, whereby during rotation one such base member slides along the surface of the seal.

At the right end coupling member 62 is flared to an enlarged diameter. The right facing rim of that short section contains a peripherally extending slot that in turn seats an O-ring seal 88, which in turn seals against a confronting rim of principal adapter 64, assembled thereto as illustrated.

Figure 4:
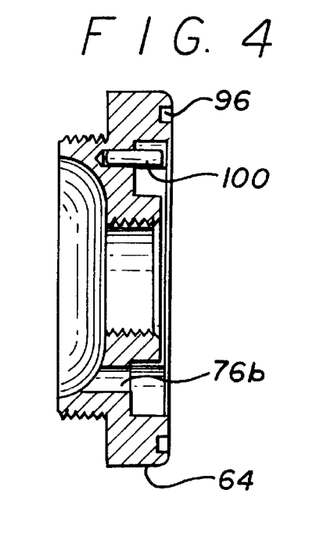
FIG. 4 is an elevational cross sectional view of a principal adapter of the filter port adapter assembly of FIG. 3 taken across line 4—4 of FIG. 5.
Figure 5:
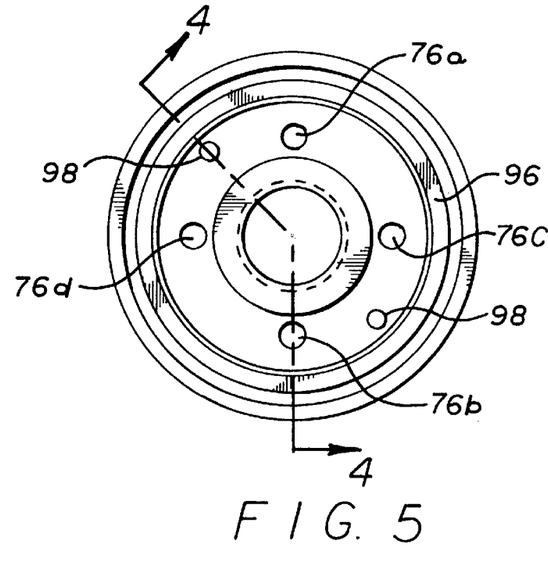
FIG. 5 is a plan view of the principal adapter of FIG. 4.
Figure 6:
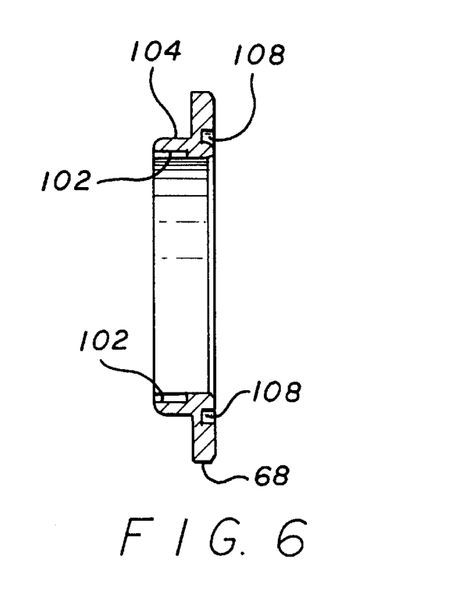
FIG. 6 is an elevational cross sectional view of a secondary adapter of the filter port adapter assembly of FIG. 3.
Figure 7:
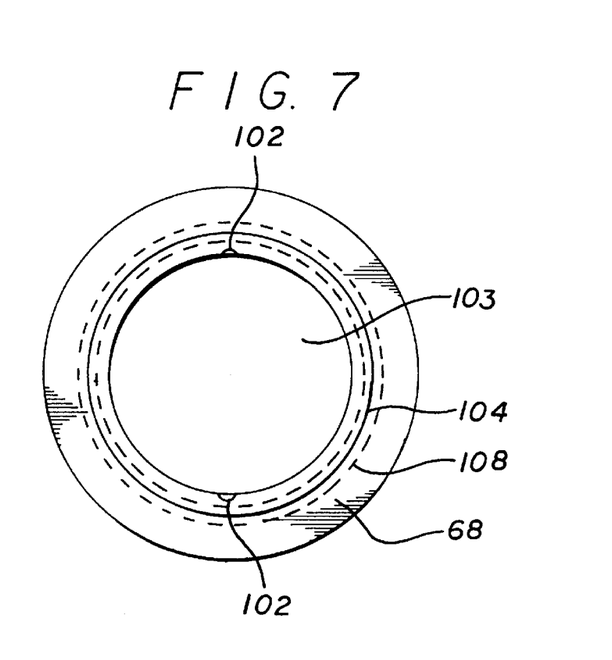
FIG. 7 is a plan view of the secondary adapter of FIG. 6.
Figure 8:
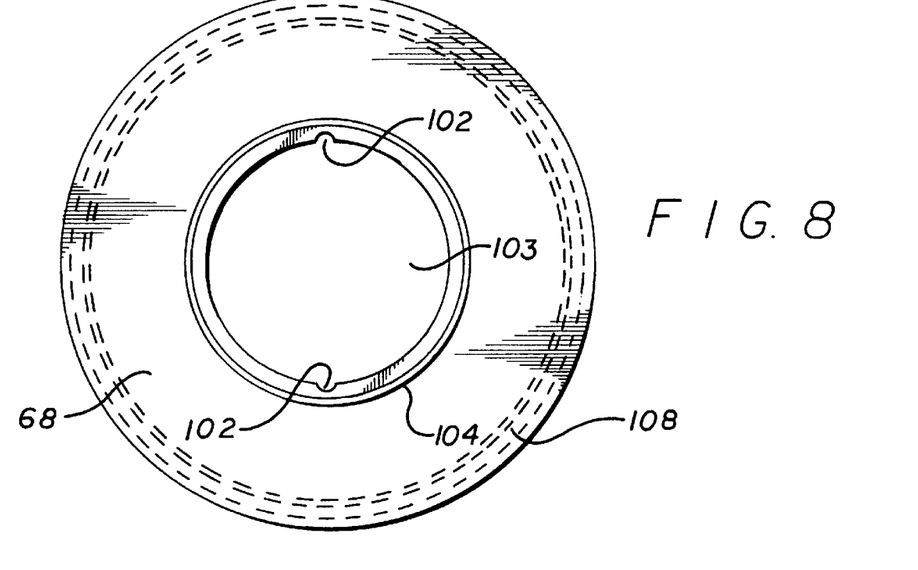
FIG. 8 is a plan view of a second preferred embodiment of a secondary adapter of the filter port adapter assembly of FIG. 3.
Figure 9:
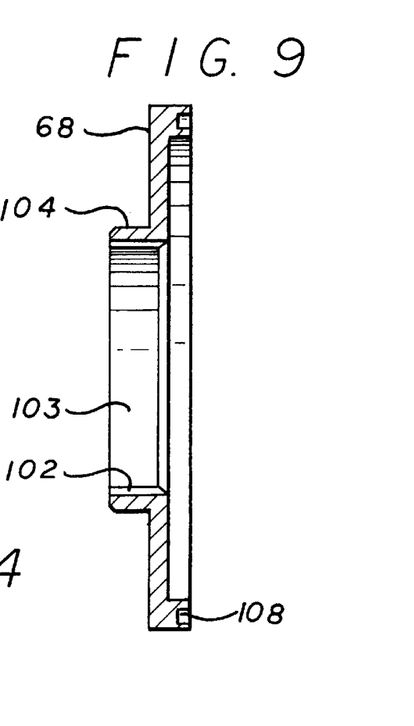
FIG. 9 is an elevational cross sectional view of the secondary adapter of FIG. 8.

Referring to FIGS. 3, 4 and 5, the principal adapter 64 is a generally disk shaped member, typically formed of aluminum, containing a protruding cylindrical portion 90 or hub having a threaded outer surface 92 for connection to a correspondingly threaded portion of the base member 62, illustrated in FIG. 3. A circular rim portion to the principal adapter which borders the outer edge is flat in geometry so that, when assembled to the coupling member 62, the surface provides a better seal to O-ring seal 88 on the base portion. On the opposite side, principal adapter 64 includes an O-ring seal 94. The O-ring seal is seated within a groove or slot 96, as variously termed, visible in FIG. 5, that is formed within and recessed from the outer surface of the rim and peripherally encircles the rear face of the principal adapter. Also formed within and recessed from the outer surface of the rim are a plurality of first indexing pin receptacles 98 for receiving first ends of a corresponding number of indexing pins 100 or dowels in press fit or friction fit engagement. A secondary adapter 68 with a corresponding plurality of second indexing pin receptacles 102 for receiving the second ends of the indexing pins in a low tolerance sliding fit permits the secondary adapter to be secured between the engine filter port and the primary adapter assembly, and indexed to the primary adapter assembly, so that the connection between the primary and secondary adapters and the engine filter port will not seize up or lock up. While two indexing pins are preferably used to index the primary adapter assembly to the secondary adapter, additional indexing pins may also be utilized.

The cylindrical hub 90 on the reverse face of the principal adapter surrounds a bowl shaped portion recessed from the front face. A large circular axially extending passage 75 is located within the principal adapter, extending through the bottom of the bowl shaped recessed portion. Four identical axially extending passages 76a, 76b, 76c and 76d are symmetrically distributed about and are equidistant from the central passage 75.

It should be appreciated that central passage 75 is larger in cross sectional area than any of the smaller passages 76a–76d, and that passage 46 through the oil filter mounting post 58, is also larger than any of those smaller passages. During operation in which the oil filter port adapter is assembled onto the oil filter mounting post with passage 75 threadingly secured to the threaded exterior of the oil port's mounting post, the flow of cleaning fluid through the cross section area of the central passage, essentially the cross section area of passage 46 in the oil filter mounting post, A1, is intended to be larger than the flow collective cross section areas of all of those small passages, A2, A3, A4, and A5, in total, At. The selected flow ratio between the flow through the cross section area of the central passage, A1, defined by the hollow of the mounting post, to the flow through the total cross section areas of the individual smaller passages, At, is typically approximately 4:1.

Principal adapter 64 is one of a set of such pieces, all of which can be joined to the universal coupling 62. Six or more of such adapters are typically employed, differing from one another essentially in the size of the central passage 75 and the size of the peripheral passages 76a–76d.

The same flow ratio is typically used in all of the principal adapters, and the flow ratio thus selected or otherwise derived is a constant. The diameter, configuration and conductance of the adapter passages serves as a means to regulate or control the relative distribution and flow of the flushing fluid being pumped from the flushing equipment to one side of the adapter as between the engine channels directed to the oil pump and those oil passageways directed to the principal engine components. While four small passages are used in this embodiment, it is recognized that in other embodiments, different numbers of small passages may be used.

It is recognized that perhaps some model of a prior adapter, which must also contain at least a central and outer passage in the adapter, may contain a flow ratio between the cross section areas that falls within the aforedescribed range of 2 to 8, and, indeed may contain one that by chance, would have a ratio of four, purely by chance, although the present applicant's have not investigated and/or verified any such prior adapters, but to applicant's present knowledge, whatever the ratio may be, the identical ratio is not maintained throughout the set of adapters associated with such flushing apparatus. In those instances, as earlier described in the background to this specification, for a given prior flushing apparatus, containing multiple adapters, the flow ratio for the cleaning fluid varies from engine to engine with different adapters in the flushing apparatus.

The next step in the assembly is to select and install the secondary adapter, 68. Adapter 68 is one of a set of such adapters that includes other adapters, such as are illustrated in FIGS. 6–9. Each of those secondary adapters is of a different outer diameter and have different diameter o-ring seals, appropriate to the different outer diameters of the oil filter port of different automobiles. The secondary adapter contains a large central opening 103, and so cannot obstruct the fluid which exits from the two sets of passages in principal adapter 64. And each of the adapters contains an annular seal surface that is flat and, when assembled abuts against o-ring seal 94 of the principal adapter. The annular seal surface of larger secondary adapters is preferably formed as an annular channel or recess so as to allow the outer edge of the principal adapter to be received in the channel in mating engagement.

Referring to FIGS. 3 and 6–9, the secondary adapter is a generally disk shaped short cylinder formed of metal, typically aluminum, that contains a short cylindrical non-threaded portion or hub 104, projecting from the front face, which serves as a male coupling to the mating principal adapter earlier selected for the assembly. O-ring seal 106 (shown in FIG. 3) is carried by a circumferential slot 108 in the face of the secondary adapter.

For a given automobile, the secondary adapter is selected so that the O-ring seal is of like diameter and engages the seal surface of the oil filter port. Thus a variety of different diameter O-ring seals and the supporting adapter, also of different diameter, may be provided with the flushing equipment. This allows the equipment to service the vast majority of automobiles.

The present invention provides for an oil pan drain port adapter assembly. Referring to FIGS. 10–13, the engine oil pan drain port adapter assembly 110 includes a main adapter member 112 having a head end or inlet end 114, an outlet end 116, and an interior flow passage 118 connecting the inlet end and outlet end in fluid communication. The main adapter member is fabricated so that the orientation of the connection to the various interchangeable adapter members 120 that connect to the oil pan drain port is identical, and so that the angle of orientation of the interchangeable adapter members to the longitudinal axis of the main adapter member is fixed. In a presently preferred embodiment, this angle of orientation is 90 degrees, although the head of the main adapter member can be formed to present another similar suitable angle of orientation, as desired.

Figures 10, 11, 13:
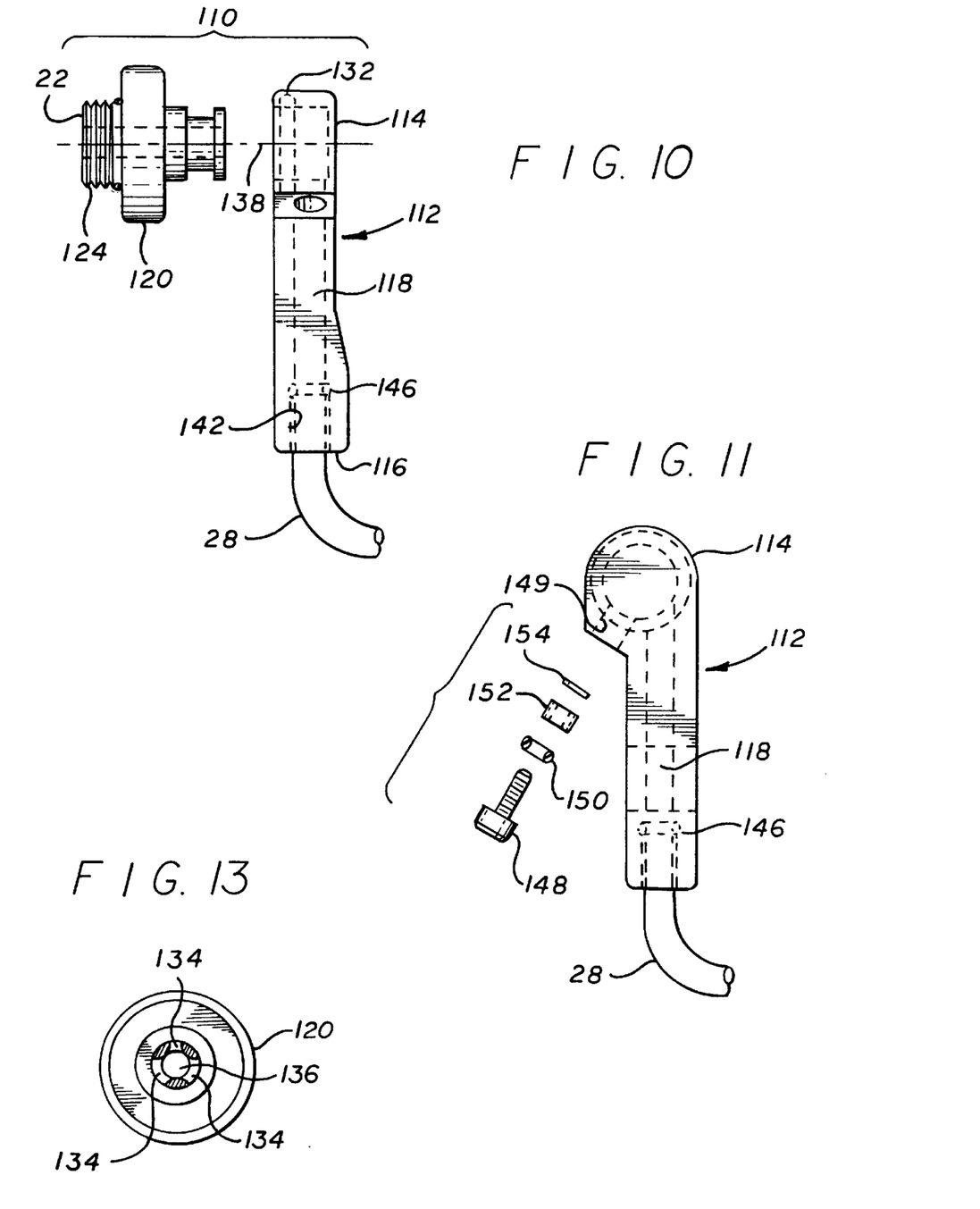
FIG. 10 is a side elevational exploded view of the main adapter member and an interchangeable adapter member of the oil pan drain port adapter system of the invention.
FIG. 11 is a front elevational view of the main adapter member of FIG. 10.
FIG. 13 is a cross-sectional view of the interchangeable adapter member of FIG. 12, taken along line 13—13.
Figure 12:
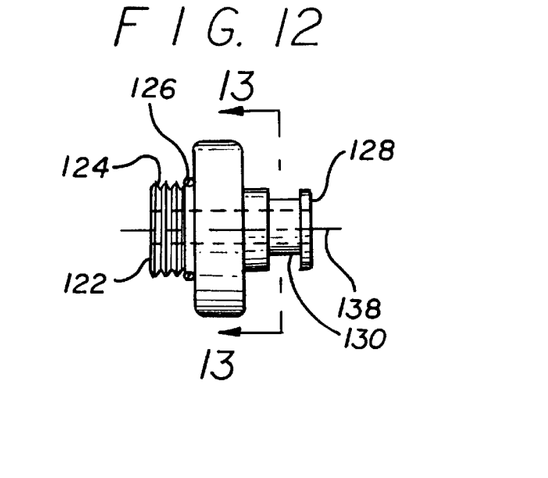
FIG. 12 is a side elevational view of an interchangeable adapter member for use with the main adapter member of the oil pan drain port adapter system of the invention.
Figure 14:
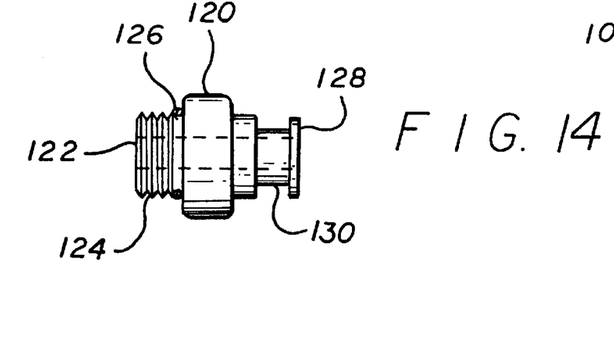
FIG. 14 is a side elevational view of another interchangeable adapter member for use with the main adapter member of the oil pan drain port adapter system of the invention.

Referring to FIGS. 12, 13 and 14, the interchangeable adapter members have one end with a protruding short cylindrical end portion or hub 122 having threads 124 to engage and mate with corresponding threads in the oil pan drain port. An O-ring 126 is also preferably disposed on the hub to prevent fluid leakage at the engine oil pan drain port. The interchangeable adapter members have an opposing end portion 128 forming an annulus 130, that fits into the right angle inlet end of the main adapter member, through an O-ring 132 disposed in the inlet end of the main adapter member to provide a seal to prevent fluid leakage. The annulus has a plurality of apertures 134 extending through the annulus to the interior duct 136 of the interchangeable adapter member that extends therethrough along the axis 138 of the interchangeable adapter member, to permit fluid flow from the interchangeable adapter member to the inlet of the main adapter member.

In a presently preferred embodiment, the annulus has three apertures spaced apart at approximately 120 degree intervals, although another number of apertures may also be suitable. When the main adapter member and interchangeable adapter member are assembled, the oil pan drain port assembly permits fluid flow from the interchangeable adapter member, through the interior flow passage to the main adapter member outlet and the pipe fitting or hose fitting 142. The pipe fitting is typically approximately transverse to the axis of the interchangeable adapter member and the principal passage of the oil pan drain port. The pipe fitting is connected to the return conduit or hose 28. An O-ring 146 is preferably disposed in the outlet pipe fitting to seal the connection against fluid leakage.

A set screw 148, which in one presently preferred embodiment can be a thumb screw, for example, is threaded into an aperture 149 in the main adapter member so that when an interchangeable adapter member is inserted into the main adapter member, the end of the set screw extends within and rides in the annulus of the interchangeable adapter member, preventing the interchangeable adapter member from being dislodged from the main adapter member. An O-ring 150 prevents fluid leakage from the main adapter member and air seepage into the main adapter member through the set screw threads. A bushing 152 is preferably installed in the aperture in the main adapter member to provide threads for the set screw. An external retainer ring 154 is also preferably inserted in the set screw opening in the main adapter member to prevent the set screw from being removed from the main adapter member. As an alternative to the external retainer ring 154, the following methods may be used to prevent the set screw from being removed from the main adapter:

1. The end of the set screw 148 which extends into the annulus 130 can be peened to increase the end diameter of the set screw by about 0.002 inch.
2. The bottom two threads of the set screw can be marred to prevent the set screw from being removed from the main adapter member.

It will be apparent from the foregoing that while particular forms of the invention have been illustrated and described, various modifications can be made without departing from

What is claimed is:

1. An oil pap drain port adapter assembly for an engine flushing system for circulating flushing fluid through an internal combustion engine to clean the engine, the engine being of the type containing an engine block, the engine block having an oil filter port and an oil drain pan having an oil drain pan port, the oil filter port and the oil drain pan port being in fluid communication, the flushing system including flushing apparatus for delivering a volume of flushing fluid to the oil filter port and for receiving used flushing fluid from the oil drain pan port, a first conduit for delivering flushing fluid from the flushing apparatus to the oil filter port, and a second conduit for conducting flushing fluid from the oil drain pan port to said flushing apparatus, the drain pan port adapter assembly fitting the oil drain pan port of the engine and creating a liquid tight seal therewith, the drain pan port adapter assembly comprising:

a main adapter member having a longitudinal axis, an inlet end, an outlet end, and an interior flow passage connecting the inlet end and outlet end in fluid communication; and an interchangeable adapter member having a first threaded cylindrical end portion for engaging and mating with a corresponding threaded portion in the oil pan drain port, an opposing end portion forming an annulus, and an interior lumen connecting the first threaded cylindrical end portion and the opposing end portion in fluid communication, the annulus having a surface defining a plurality of apertures extending through the annulus to the interior lumen of the interchangeable adapter member to permit fluid flow from the interchangeable adapter member to the inlet of the main adapter member, the opposing end portion of the interchangeable adapter member being received in the inlet end of the main adapter member at a fixed angle of orientation with respect to the longitudinal axis of the main adapter member.

2. The assembly of claim 1, wherein said main adapter member has a surface defining a set screw aperture, and further including a set screw having a threaded portion received in the set screw aperture of the main adapter member such that when the interchangeable adapter member is inserted into inlet end of the main adapter member, the set screw extends within and rides in the annulus of the interchangeable adapter member, preventing the interchangeable adapter member from being dislodged from the main adapter member.

3. The assembly of claim 2, wherein said set screw comprises a thumb screw.

4. The assembly of claim 2, further comprising an O-ring disposed on said set screw to prevent fluid leakage from the main adapter member and air seepage into the main adapter member through the set screw aperture of the main adapter member.

5. The assembly of claim 4, further comprising a threaded bushing disposed in said set screw aperture in the main adapter member to provide threads for receiving the set screw.

6. The assembly of claim 5, further comprising an external retainer ring disposed in the set screw aperture in the main adapter member to prevent the set screw from being removed from the main adapter member.

7. The assembly of claim 1, wherein the annulus has three spaced apart apertures.

8. The assembly of claim 1, wherein said fixed angle of orientation of the interchangeable adapter member is approximately 90 degrees.

9. The assembly of claim 1, wherein the annulus fits through an O-ring disposed in the inlet end of the main adapter member to provide a seal to prevent fluid leakage.

10. The assembly of claim 1, wherein said outlet end of the main adapter member comprises a fitting connected to the return conduit, said fitting being approximately transverse to the axis of the interchangeable adapter member and the principal passage of the oil pan drain port.

11. The assembly of claim 1, wherein an O-ring is disposed on the first threaded cylindrical end portion of the interchangeable adapter member to prevent fluid leakage at the engine oil pan drain port.

12. A drain pan port adapter assembly for an engine flushing system for circulating flushing fluid through an internal combustion engine to clean the engine, the engine being of the type containing an engine block, the engine block having an oil filter port and an oil drain pan having an oil drain pan port, the oil filter port and the oil drain pan port being in fluid communication, the flushing system including flushing apparatus for delivering a volume of flushing fluid to the oil filter port and for receiving used flushing fluid from the oil drain pan port, a first conduit for delivering flushing fluid from the flushing apparatus to the oil filter port, and a second conduit for conducting flushing fluid from the oil drain pan port to said flushing apparatus, the drain pan port adapter assembly fitting the oil drain pan port of the engine and creating a liquid tight seal therewith, the drain pan port adapter assembly comprising:

a main adapter member having a longitudinal axis, an inlet end, an outlet end, and an interior flow passage connecting the inlet end and outlet end in fluid communication; and a plurality of interchangeable adapter members each having a first threaded cylindrical end portion for engaging and mating with a corresponding threaded portion in the oil pan drain port, an opposing end portion forming an annulus, and an interior lumen connecting the first threaded cylindrical end portion and the opposing end portion in fluid communication, the annulus having a surface defining a plurality of apertures extending through the annulus to the interior lumen of the interchangeable adapter member to permit fluid flow from the interchangeable adapter member to the inlet of the main adapter member, the opposing end portion of each said interchangeable adapter member being received in the inlet end of the main adapter member at a fixed angle of orientation with respect to the longitudinal axis of the main adapter member.

13. The assembly of claim 12, wherein said main adapter member has a surface defining a set screw aperture, and further including a set screw having a threaded portion received in the set screw aperture of the main adapter member such that when the interchangeable adapter member is inserted into inlet end of the main adapter member, the set screw extends within and rides in the annulus of the interchangeable adapter member, preventing the interchangeable adapter member from being dislodged from the main adapter member.

14. The assembly of claim 13, wherein said set screw comprises a thumb screw.

15. The assembly of claim 13, further comprising an O-ring disposed on said set screw to prevent fluid leakage from the main adapter member and air seepage into the main adapter member through the set screw aperture of the main adapter member.

16. The assembly of claim 15, further comprising a threaded bushing disposed in said set screw aperture in the main adapter member to provide threads for receiving the set screw.

17. The assembly of claim 16, further comprising an external retainer ring disposed in the set screw aperture in the main adapter member to prevent the set screw from being removed from the main adapter member.

18. The assembly of claim 12, wherein the annulus has three spaced apart apertures.

19. The assembly of claim 12, wherein said fixed angle of orientation of the interchangeable adapter member is approximately 90 degrees.

20. The assembly of claim 12, wherein the annulus fits through an O-ring disposed in the inlet end of the main adapter member to provide a seal to prevent fluid leakage.

21. The assembly of claim 12, wherein said outlet end of the main adapter member comprises a fitting connected to the return conduit, said fitting being approximately transverse to the axis of the interchangeable adapter member and the principal passage of the oil pan drain port.

22. The assembly of claim 12, wherein an O-ring is disposed on the first threaded cylindrical end portion of the interchangeable adapter member to prevent fluid leakage at the engine oil pan drain port.

\* \* \* \* \*

UNITED STATES PATENT AND TRADEMARK OFFICE
CERTIFICATE OF CORRECTION

PATENT NO.  : 5,813,382
DATED       : Sep. 29, 1998
INVENTOR(S) : Victor A. Grigorian, Martin Renwick, Seymour Seplow It is certified that error appears in the above-identified patent and that said Letters Patent is hereby corrected as shown below:

Column 9, claim 1, line 5, change "pap", to read --pan--.

Signed and Sealed this

Fifth Day of January, 1999

Attest:

Attesting Officer

*Acting Commissioner of Patents and Trademarks*